May 28, 1968     H. A. HARRY     3,385,018
MULTIPART SEALING ELEMENT FOR CORRUGATED PANEL ASSEMBLIES
Filed Oct. 10, 1966     2 Sheets-Sheet 1
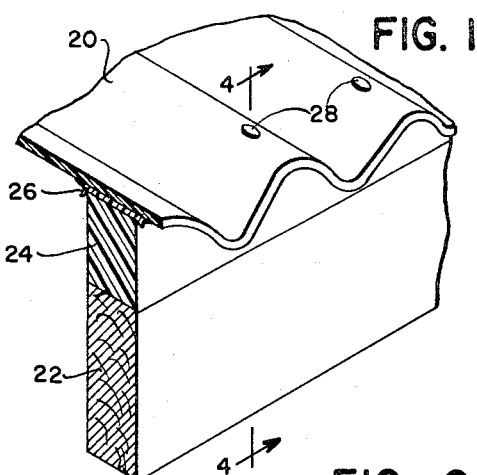
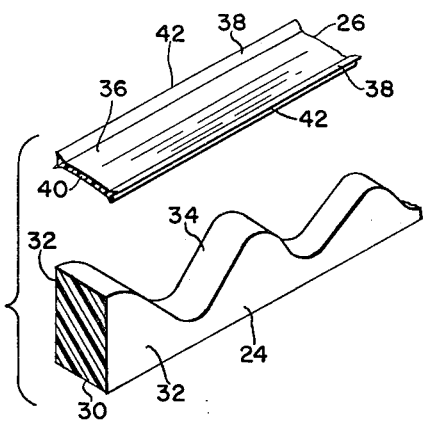
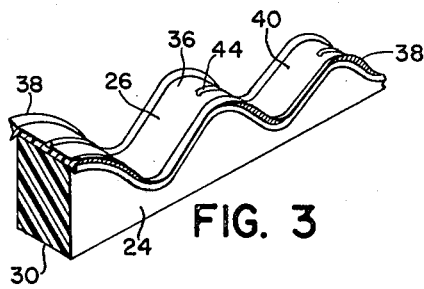
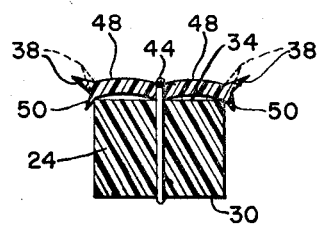
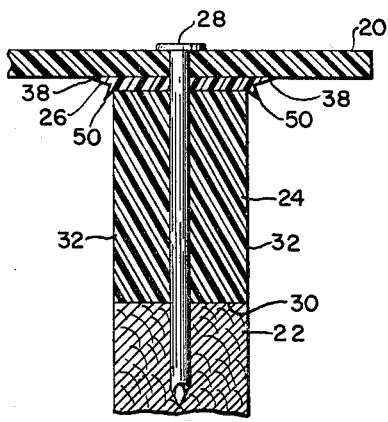
*INVENTOR.*
HENRY A. HARRY

*INVENTOR.*
HENRY A. HARRY

United States Patent Office 3,385,018
Patented May 28, 1968

3,385,018
MULTIPART SEALING ELEMENT FOR
CORRUGATED PANEL ASSEMBLIES
Henry A. Harry, 415 N. Country Club Drive,
McHenry, Ill. 60050
Filed Oct. 10, 1966, Ser. No. 589,777
13 Claims. (Cl. 52—403)

ABSTRACT OF THE DISCLOSURE

A two-piece sealing strip in which the under surface is flat and the outer surface is sinuous, wherein the underpart is basically a low-cost relatively thick element and the outerpart is a strip of better material and having good sealing qualities and is flexible so as to conform to the underpart either before or during assembly of the two between a support and corrugated panel.

This invention relates to a sealing element that finds particular utility in assemblies utilizing corrugated panels as walls, roofs, etc., wherein problems not involved in ordinary construction are presented because of the configuration of the panels relative to straight supports. More especially, the invention constitutes an improvement over the construction forming the subject matter of the U.S. patent to Henry A. Harry, No. 2,853,330.

The sealing element in the above patent is a one-piece element of elastomer material such as rubber and comprises essentially an elongated body whose major cross-section is relatively thick but which has a pair of laterally spaced apart longitudinal wings terminating respectively in feathered edges readily capable of adapting themselves to the corrugations of the panel, the body having a flat undersurface for lying along a straight support and the upper surface, which includes the wings, being longitudinally sinuous to conform to the panel. Thus, when assembly pressure is applied, as by nailing the panel to a support with the seal interposed therebetween, the wings deflected and accommodate variations in the pitch, surface, etc. of the panel. Further, as the panel weaves relative to the support because of movement induced by winds, settling of the building and other causes, the seal is maintained as the flexible wings continue to follow the panel. Experience has shown that the patented seal is so far superior to other seals, including former seals generated by felt, caulking, etc., that in the recent past it has virtually supplanted such prior seals in the corrugated panel construction industry.

However, the patented seal has been found to be susceptible to at least one shortcoming, brought about largely by manufacturing abuses growing out of attempts to economize by using inferior materials, giving rise to structural failures in the seal in the areas where the flexible wings join the main body of the sealing element. That is to say, where adequate but more expensive materials are used, the seal still meets the original standards, but where the seal is made of, say, reclaimed rubber, it is incapable of long withstanding the stresss and strains imposed thereon.

Stated most simply, the present invention makes a significant improvement in the prior seal by utilizing basically a two-part construction in which the main, relatively thick part is formed as one piece and the winged panel-engaging part is formed as a wholly separate piece, thus making it possible to make the base part of relatively inexpensive material and shifting the cost-savings thus obtained into the formation of what may be termed a ribbon-like winged filler strip, the characteristics of which are even far superior to even the best construction of the prior patented seal, because the filler strip, with its integral wings or sets of wings, can be made of flexible, relatively dense material having superior sealing and longevity characteristics, a material whose cost would be prohibitive if the entire seal were constructed in one piece. One example of such material is an elastomer such as extruded vinyl, neoprene etc. The base member can be of virtually any nature and composition, such as wood, foam polystyrene, sponge rubber, common rubber and the like; in short, any material that has at least some structural strength, that is capable of substantially retaining its form and fundamentally that is so inexpensive that the combined use of it and the filler strip results in a unit sealing element that can be produced at a cost and with such sealing and longevity characteristics as to far exceed the same qualities in a comparable one-piece element of the above patented type.

It is a further feature of the invention that the sealing relationship between the base and filler elements is constructed in such manner that there is no loss of sealing power merely because of the two-piece design. This problem is solved by so constructing the filler strip in its area in which it contacts the base member in such manner that cooperating flexing edge portions of the filler tightly contact the base. This is achieved by imparting to the filler a slightly concave lateral cross-section as respects the cooperative laterally flat surface of the base so that when assembly pressure is applied to compress the two members together the opposed longitudinal edges of the filler more tightly engage the base surface. This feature is further enhanced by providing on the filler opposite longitudinal ribs with feathered edges to engage the base surface. Still further, these ribs may be spaced apart by a dimension greater than the lateral width of the base member so that the edges overhang the base member. Yet a further object and feature of the invention resides in the manner of attaching the base and filler members together. This means need only be such as to hold the two together to permit unit installation and thus high-cost adhesives and the like need not be employed. Instead, the two may be simply stitched or stapled together, and this manner of attachment may be localized along the center of the filler strip so that the laterally outer edge portions are relatively free, thus enabling the strip to even more readily accommodate itself to both the base member and to the corrugated panel. For example, as to the base member, the strip in the areas between its edges and the central attaching means is free to bow and flex, absorbing stresses imposed on the wings instead of "pivoting" the wings relative to the filler body therebetween and also pressing the base-member-engaging edges more closely into contact with the base member. Thus the fulcra inherent in the one-piece construction, and in the areas in which bending and flexing forces are concentrated, are even further avoided. In short, the filler strip or member is given the capability to "breathe" along with the other components of the assembly and instead of constantly bending and twisting in localized areas is capacitated to float and flex substantially free from weakening effects.

A still further advantage lies in the capability of initially forming the base member with, for example, a lower straight surface for resting on and lying along the support and an opposite or top surface which is longitudinally sinuous to conform to the pitch and shape of the panel corrugations; although, of course, this sinuous surface is formed so as to lie just short of contact with the panel because contact is achieved by the filler strip. Thus this strip can be formed straight, as by extrusion; that is, it need not be formed as a sinuous member because its flexibility enables it to be formed straight and then laid into the base member sinuous surface, which it will readily follow and to which it will remain conformed by the means attaching the two members together for unit handling. This is a further cost saving that may be shifted to the filler material strip itself, which, after all, bears the brunt of the sealing function. In other words, the better the filler strip, the better the overall seal.

Further objects inherent in and encompassed by the invention will become apparent as several modifications of the improved seal are disclosed, by way of examples, in the ensuing description and accompanying drawings, the figures of which are described below.

FIGURE 1 is a fragmentary perspective showing a representative panel-seal-support assembly.

FIGURE 2 is an enlarged perspective showing the relationship of the base and filler members prior to assembly.

FIGURE 3 shows the members assembled.

FIGURE 4 is an enlarged section on the line 4—4 of FIGURE 1.

FIGURE 7 is a transverse section showing the action of the flexible seal member between uncompressed position (dotted) and partly compressed status (full lines).

Figure 5:
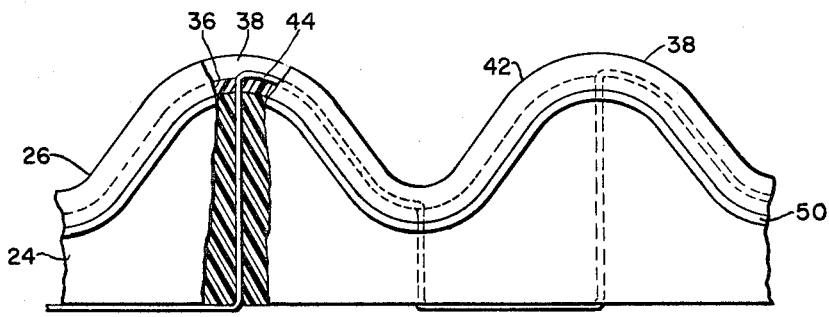
FIGURE 5 is an enlarged fragmentary elevation, partly in section, showing one form of means for attaching the two sealing parts together.

FIGURE 1 shows a corrugated panel 20, which may be of any construction such as asbestos-cement, metal, rigid plastic, etc., all of which are known, mounted on an elongated support 22 with a multipart sealing element 24, 26 sandwiched therebetween, the support 22 running transverse to the corrugations of the panel and the element 24, 26 lying lengthwise of the support. The construction is shown here as completed by nails 28 driven through the above-described components; although any form of fastener may be used in lieu of the nails. The support 22 may be of wood or other material compatible with the nails or whatever fasteners are used. The above patent and others related thereto explain the sealing problems in assemblies of this type and need not be repeated here.

FIGURE 2 best shows the relatively thick base member 24 as having a support-engaging surface 30, opposite longitudinal sides 32 generally normal to the surface 30 and a panel-proximate surface 34 that is longitudinally sinuous on the order of the (here) under face of the panel, allowing for the thickness of the elongated ribbon-like filler member 26. The member 24 is of relatively rigid low-cost material that tends to permit handling without undue distortion so that it will remain essentially straight after the filler strip 26 is attached thereto. This facilitates manufacture, shipping, storage, etc. Any suitable material such as wood, inexpensive rubber, sponge rubber, polystyrene, etc., may be used, the principle being that costs saved in the production of this member may be transferred into improvement of the nature and structure of the filler strip 26 so as to achieve the necessary sealing and longevity characteristics.

The filler strip 26 may be of any suitable material having the above qualities, suitable material being found to exist among elastomers such as those including extruded vinyl, neoprene and the like, and in many cases a relatively high-quality rubber will be found adequate. Broadly, this material should be relatively dense and flexible and capable of recovering substantially its original shape after deformation, especially because of its construction as a ribbon-like member having a central channel 36 between at least a pair of longitudinal continuous wings 38 integral with a body 40, the top surface of which here forms the bottom of the channel 36. Each wing is somewhat thick in its section where it adjoins the body 40 and normally (uncompressed state) tapers outwardly and laterally and terminates in a feather edge 42, the wings as respects each other flaring here upwardly and laterally outwardly. Of course, the structure shown here in horizontal disposition is illustrative only, since the components may be arranged vertically as in walls, at various angles as in roofs, etc.

Figure 6:
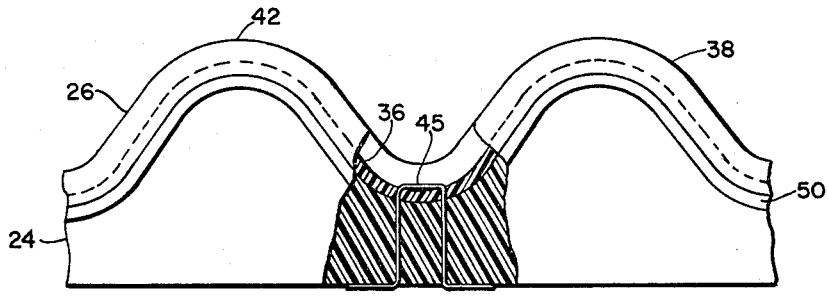
FIGURE 6 is a similar view showing another form of attaching means.

The strip 26 may be readily produced by extrusion or other methods and is originally readily coiled, flexed etc., but is shown in FIGURE 2 as being straight merely to illustrate its initial or pre-assembled relationship to the sinuously topped base member 24. When the two members are united as in FIGURE 3, the flexible strip 26 readily accommodates itself to the sinuous top 34 of the base member 24, curving over and down into the successive peaks and valleys established by the sinuous shape of the base member. The two members are united in their FIGURE 3 condition by attaching means 44, in this form of the invention represented by stitching with a suitable strand passed through the members at the peaks and valleys. The strand is of such gauge as to be substantially imperceptible so far as concerns any interference with the sealing qualities of the multipart element 24, 26. An alternate form of attaching means is shown at 45 in FIGURE 6 as including rust-proof staples inserted through the element at the valleys thereof. Here again, the gauge of the wire used in the staples is such as to have no adverse effect on the element. The foregoing will suggest other means of attaching the two members for ultimate assembly as a readily handled, installed unit seal element for use in construction of which FIGURE 1 is typical.

The use of attaching means confined substantally to the median line of the filler strip 26 has significant advantages which flow mainly from the initial formation of the strip with such cross-section as to give it a slightly bowed or arcuate form, causing its undersurface to be concave as respects the laterally flat top surface of the base member 24. See FIGURE 2. As the attaching means 44 (or 45) is drawn down in initial assembly, the filler strip 26 tends to assume the double-bowed form shown in slightly exaggerated fashion in FIGURE 7, at 48—48, which causes marginal edges of the filler strip 26 to more tightly engage the longitudinally opposite upper edges of the base member, thus materially improving the seal between the two members and enabling the use of the centrally confined attaching means. This function is further augmented by providing each marginal edge of the filler strip 26 with a longitudinal marginal rib or lip 50. Preferably the lateral dimension of the filler strip as measured from tip to tip of the ribs 50 slightly exceeds the transverse dimension of the base member 24 so that the terminal edges of the ribs overhang the respective top corners of the base member (FIG. 7), still further improving the weathertight relation between the two members 24, 26.

The foregoing construction presents several advantages, the more significant of which, in addition to the sealing effect described above, are, first, the ability of the unit seal 24, 26 to adapt itself initially to the assembly of the panel-seal-support structure; second, the ability of the element 24, 26 to adapt itself to the structure as said structure weaves and "breathes" in use, as from forces induced by wind, weather, settling of the building, etc.; and, third, the ability of the filler strip itself to withstand a multitude of flexing, twisting, bending and other forces without causing the wings to break off at their junctions with the filler strip body 40, as is the case with the former patented construction unless due care is taken in the selection of materials and production of the one-piece strip. These advantages will be understood as it becomes clear that the wings 38 initially stand out, as shown in FIGURE 3, and of course follow the general sinuousity as established by the top sinuous surface of the base member 24, which, as described above, is several times the thicknness of the filler strip 26 and thus occupies the greater majority of the space between the support 22 and the panel 20. As the panel is installed, its mere weight begins the laterally oppositely outward deflection of the wings and, as the nails, or other fasteners are fully applied, the total compression (FIGURE 4) is completed. Because of the combined effect of the bowed cross-section of the strip 26, the slight overhang of the ribs 50 and the ribs themselves, there is no single or localized fulcrum or pivot axis about which the wings 38 will deflect. Thus, because of imperfections in panel surface or lack of uniformity of pitch and/or depth of the corrugations of the panel, or as the nails tend to loosen with time, weaving, etc. of the structure, and the wings follow the panel, there is no exact orientation of flexure as in the one-piece patented structure. Then, as the nails are tightened, as during maintenance, or as the panel pressure increases through various causes such as weaving, etc., the wings can again move toward their FIG. 4 status, again avoiding localized bending stresses. The wings 36 also follow the panel as the latter tends to shift at times crosswise of the seal or even as the panel twists or otherwise deforms or changes position. Since the opposite outer edges of the filler strip are free from secured contact with the top of the base member, the strip thus has more freedom to float and its feather edges tending to stay with the panel even though the base member may tend to stay with the support 22.

The above will be further understood from the fact that the formation of the ribs gives the filler strip a somewhat increased thickness and strength at its marginal edges and, if the base member is somewhat compressible, the thickened portions can dig in and thus can further exert a laterally inward force, not only avoiding localization of fulcra but also tightening the seal between the undersurface of the strip 26 along its edges and the top edges of the base member 24.

Figure 8:
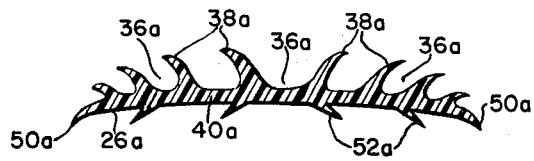
FIGURES 8, 9 and 10 are enlarged sectional views illustrating modified forms of flexible seal members.
Figure 9:
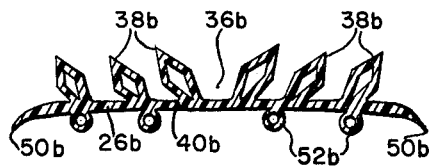
Figure 10:
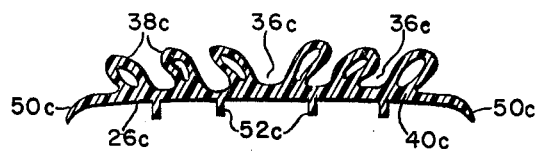

Apart from the foregoing advantages attributable to the specific structure just described, the basic advantage of the two-piece construction exists broadly in the ability to concentrate costs in the filler strip 26 by saving costs in the base member 24. In addition, the capacity of the unit seal 24, 26 to lend itself to assembly by simple attaching means is also a significant advantage. Thus, so far as concerns the broad invention, the overhanging feature, the rib feature, etc., are to be regarded as importantly supplementary and not limiting the broader aspects of the invention. This is true also of the modified forms of the invention shown in FIGURES 8–10 where the differences are mainly in the provision of an increased number of channels and wings. Thus, FIGURE 8 comprises a filler strip 26a having a body 40a from which a plurality of wings 38a rise in paired flaring fashion to provide several channels 36a. The strip has marginal ribs 50a and has the bowed cross-section of the strip 26. Similarly, the strip 26b of FIGURE 9 has the bowed body 40b from which rise paired flaring wings 38b to provide channels 36b between marginal ribs 50b, the wings being diamond shaped and tubular. In FIGURE 10, the strip 26c, bordered by marginal ribs 50c, has a body 40c in which several channels 36c are formed by a plurality of rounded tubular paired flaring wings 38c. One basically different characteristic of any of these modified forms is that, upon compressing of the seal between a panel and a support, the wings will respectively laterally outwardly overlap each other, still further augmenting the sealing relationship.

Also, the undersides of the bodies of the modified strips may be provided with longitudinal integral beads or ribs 52a, 52b and 52c, respectively. These of course will be compressed against the strip 24 in assembly so as to improve the seal between the two.

The foregoing and other advantages will be readily achieved by modifications of the disclosed forms of the invention on the basis of the teachings here, all of which may be accomplished by variations occurring to those skilled in the art.

What is claimed is:

1. For use in the assembly of a corrugated panel in spaced-apart relation to an elongated support disposed transverse to the panel corrugations: an elongated multi-part sealing element adapted to lie lengthwise along the support in interposed relation between the opposing faces of the support and panel, said element comprising an elongated relatively thick base member occupying the majority of the space between said faces and having an inner relatively wide longitudinal support-engaging surface, opposite longitudinal sides relatively widely spaced apart and generally normal to said surface and an outer relatively wide panel proximate surface longitudinally sinuous on the order of but slightly spaced from the panel face, and an elongated ribbon-like filler member separate from the base member and lying longitudinally and correspondingly sinuously along the sinuous surface of the base member between that surface and the panel face, said filler member having a longitudinal intermediate body including an inner surface confronting and having a width comparable to that of the base member outer surface and further having an outer panel confronting surface and a pair of longitudinal continuous wings integral with and spaced apart transversely of the body and flared laterally outwardly and oppositely from said panel confronting outer surface and toward the panel face, said wings terminating respectively in continuous feather edges for continuous contact with the panel face, said base member being of relatively rigid low-cost material and said filler member being of relatively dense flexible material having good sealing qualities and being readily adapted to conform to its inner surface the sinuous surface of the base member and its outer surface and wings to the corrugated face of the panel so that said edges readily adapt themselves to the panel face upon the occurrence of relative movement between the panel and the support and so that flexing and stressing of the wings is wholly accommodated by the filler member independently of the base member, and means attaching the filler and base members together.

2. The invention defined in claim 1, in which: the sinuous outer surface of the base member is substantially transversely flat and the inner surface of the body of the filler member, before assembly to the base member, is slightly concave in transverse cross-section as respects said flat surface so that pressure applied to bring said members into complete confronting contact causes the longitudinal base-member facing edges of its inner surface to attain improved contact with said base member outer surface.

3. The invention defined in claim 2, in which: said filler member has opposite longitudinal ribs along and integral with the body at its undersurface and flared laterally oppositely outwardly, said ribs terminating in feathered edges constituting the aforesaid base-member facing edges.

4. The invention defined in claim 3, in which: the lateral dimension of the body exceeds that of the base member so that said ribs respectively overhang the opposite longitudinal sides of the base member.

5. The invention defined in claim 1, in which: said filler member has opposite longitudinal ribs along and integral with the body and flared laterally oppositely outwardly and toward the sinuous outer surface of the base member, said ribs being flexible and terminating in feathered edges operative upon pressure applied to bring said members into complete surface-to-surface contact to attain improved contact with said base member outer surface.

6. The invention defined in claim 5, in which: the lateral dimension of the body exceeds that of the base member so that said ribs respectively overhang the opposite longitudinal sides of the base member.

7. The invention defined in claim 1, in which: the means attaching the members to each other are located wholly substantially centrally between the wings so as to leave the filler member body free between said means and the outer edges of said body.

8. The invention defined in claim 7, in which: each outer edge of the body includes an integral flexible rib, said ribs flaring laterally oppositely outwardly and toward the base member.

9. The invention defined in claim 8, in which: the lateral dimension of the body exceeds that of the base member so that said ribs respectively overhang the opposite longitudinal sides of the base member.

10. The invention defined in claim 1, in which: the filler member includes integral therewith additional flared wings similar to those aforesaid.

11. The invention defined in claim 10, in which the heights of the ribs are such that those innermost at each side of the median plane of the filler member will overlap successively their neighbors as the wings are displaced respectively laterally outwardly.

12. The invention defined in claim 11, in which the wings are tubular.

13. The invention defined in claim 10, in which the wings are tubular.

References Cited

UNITED STATES PATENTS

| | | | |
|---|---|---|---|
| 2,188,815 | 1/1940 | Murphy | 161—116 X |
| 2,216,206 | 10/1940 | McKee | 161—120 X |
| 2,615,741 | 10/1952 | Nathan | 277—208 |
| 2,641,340 | 6/1953 | Howe | 52—94 X |
| 2,664,177 | 12/1953 | Hammitt et al. | 52—90 |
| 2,853,330 | 9/1958 | Harry | 277—206 |
| 3,262,236 | 7/1966 | Poyer | 52—90 X |

FOREIGN PATENTS

| | | |
|---|---|---|
| 1,372,448 | 8/1964 | France. |

FRANK L. ABBOTT, *Primary Examiner.*

CHARLES G. MUELLER, *Assistant Examiner.*